Patented Sept. 28, 1943

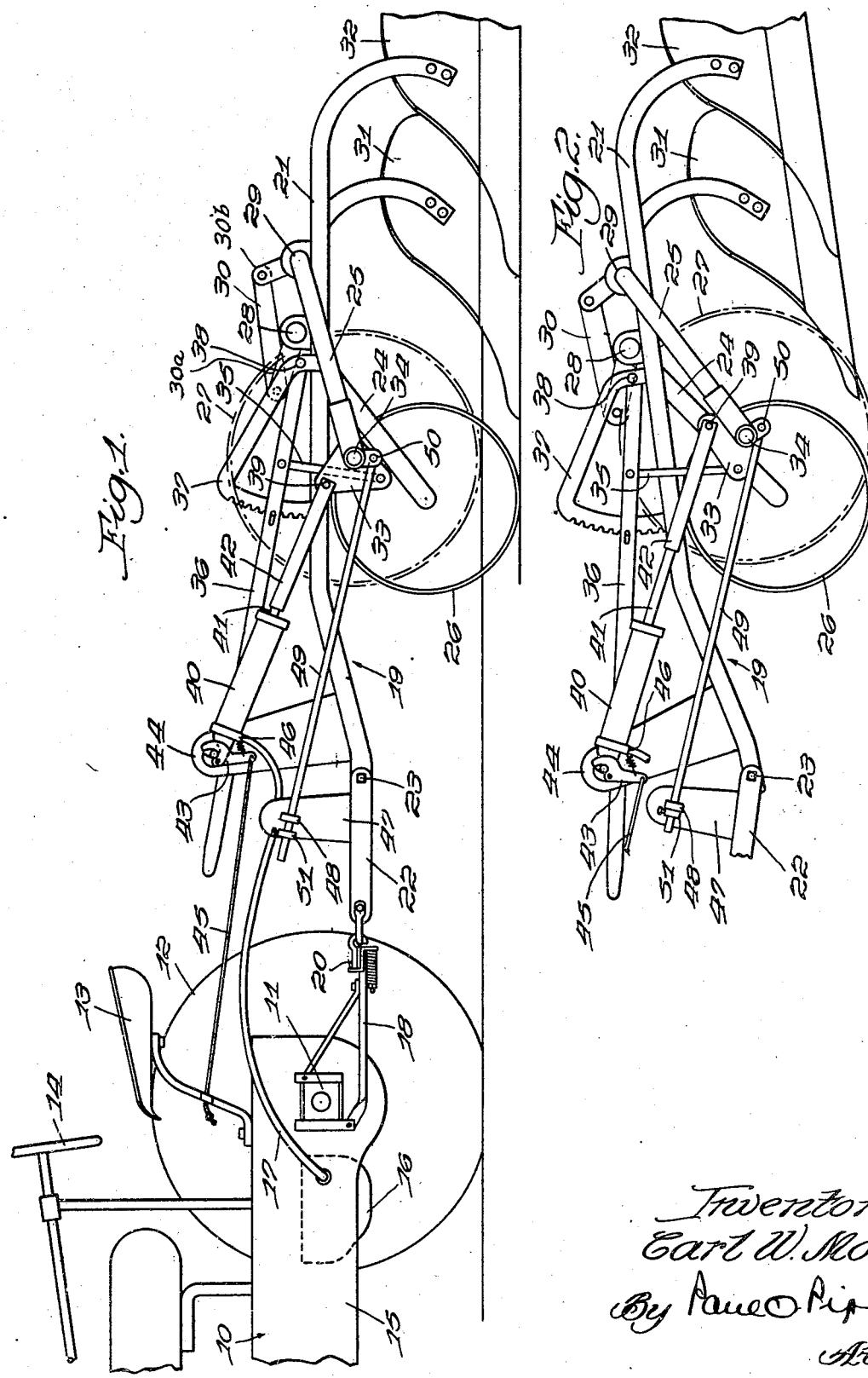

2,330,304

UNITED STATES PATENT OFFICE 2,330,304

AGRICULTURAL IMPLEMENT

Carl W. Mott, La Grange, Ill., assignor to International Harvester Company, a corporation of New Jersey Application April 11, 1942, Serial No. 438,549

7 Claims. (Cl. 97—50)

This invention relates to trail-behind implements and more particularly to trail-behind implements having parts adapted to be adjusted by power-actuated means located on the implement.

It is an object of the invention to provide a means which will serve to give to the tool-supporting frame with its tool an additional clearance than that which would be provided by the power-actuated device alone.

It is another object of the invention to provide in the means for giving additional lifting effect of the working tools, means wherein a limited amount of manual adjustment may be effected without the additional means coming into play.

According to the present invention, there is provided a main frame and a draft frame connected together by pivotal connection means. Connected with the frame is a wheel structure adapted for movement with respect to the same and a power-actuated device connected to the wheel structure to effect power adjusting of the tool frame and its working tool. Also associated with the tool frame is a manually adjustable means for effecting manual adjustment of the frame to vary the working depth of the working tools. Connected between the power-adjusted means or the wheel-supporting structure and the pivotal connection is means whereby a downward buckling movement will be effected at the pivotal connection as the wheel structure is moved by the power-actuated device. As this buckling movement is effected, the main tool-supporting frame will pivot about its wheel structure and thereby give to the rear of the same and its tools located thereon an additional clearance from the ground than that which would be provided were not this buckling movement effected. The power-actuated device takes the form of a fluid-actuated cylinder adapted to receive fluid power from a fluid source on the tractor.

For other objects and for a better understanding of the invention reference may be had to the following detailed description taken in connection with the accompanying drawing, in which:

Figure 1 is a view of the rear portion of the tractor with a trail-behind implement embodying the features of the present invention connected thereto and with their working tools in their working or plowing position;

Figure 2 is a view of the implement but with the working tools in the raised position and with its draft and main frames buckled at the point of their pivotal connection.

Referring now to the figures, there is shown a tractor 10 having a rear axle structure 11 supported on a traction wheel 12. On the rear axle structure 11 is an operator's station 13 accessible to the usual steering wheel 14. Forwardly of the rear axle structure 11 is a longitudinally extending body portion 15 having contained therein a fluid pressure source 16 from which extends a conduit means 17.

Associated with the rear axle structure is a rigid tool bar 18 adapted to have attached thereto a trail-behind implement indicated generally at 19. A releasable spring hitch 20 may be provided on the draw-bar 18. The implement 19 is that of a two-furrow plow and has a main frame 21 and a draft frame 22 connected to the forward end of the main frame 21 by a pivotal connection means 23 in such a manner that the frame may buckle downwardly to the position shown in Figure 2. Upon this action taking place, the draft frame 22 will react against the spring hitch 20 on the tool bar 18.

Connected respectively on opposite sides of the main frame and for pivotal movement with respect thereto is a pair of crank axles 24 and 25 having respectively thereon furrow and land wheels 26 and 27. These crank axles 24 and 25 are respectively pivoted at 28 and 29, the latter being rearwardly of the former and are connected together to operate in unison by means of a link 30 and arms 30a and 30b respectively fixed to the pivoted axle portions 28 and 29. The wheels 26 and 27 are located forwardly of the working tools or plow bottoms 31 and 32. Pivotally connected to the crank axle 25 is a bell-crank element 33 adapted to rotate about a pivot 34 coaxial with the wheel 27. This bell-crank 33 is connected by a link 35 to an adjustable lever 36 adapted to be operated over a quadrant 37 rigidly connected to the main frame 21. The lever 36 is pivoted at its rearward end to the quadrant 37 as indicated at 38 and extends forwardly to a location near to the operator's station on the tractor. Also connected at a point 39 on the bell-crank 33 is a power-actuated device 40.

This power-actuated device is a fluid cylinder having a piston rod 41 extended therefrom and arranged to fit in a sleeve 42 pivoted at 39 to the bell-crank 33 on the crank axle 25. The forward end of the cylinder device 40 is detachably connected by a latch means 43 to a vertically extending plate 44 on the forward end of the main tool-supporting frame 21. This latch means 43 is connected by means of a rope 45 to the operator's station 13 and should the implement break away from its connection with the releasable hitch means 20, the rope 45 will become tight and the latch 43 will be rocked to release the cylinder device 40 from the implement. This will prevent the necessity of having the conduit means 17, which connects with the fluid cylinder device at 46, from having to be of unusual length to thereby relieve the operator of the necessity to immediately stop the tractor should the implement become separated therefrom. The fluid cylinder device is next relieved from the implement and is trailed along the ground by the rope 45.

It should be apparent that the bell-crank 33 may be operated by either the manual adjusting means or by the power-actuated cylinder device. By either means the tool frame and its working tools 31 and 32 may be adjusted relative to the combined wheel structure due to the crank axles 24 and 25 being connected together to operate in unison and as a single wheel structure.

Referring now particularly to Figure 2, it will be noted that the power-actuated device 40 has been supplied with fluid from the fluid source 16 and has been extended to pivot the wheel structure with respect to the main frame 21, thereby causing the wheels 26 and 27 to be thrust downwardly and somewhat rearwardly. In this manner the plow bottoms 31 and 32 are raised out of the ground. Coming now particularly to the feature of the present invention, it will be noted that there is a connection between the crank axle 25 and an upwardly extending plate 47 on the rearward end of the draft frame 22. On the vertically extending plate 47 is an eye-bolt 48 through which extends a rod 49 connected at its rearward end to a lug 50 on the end of the crank axle 25. Since a certain amount of movement is desired without the buckling of the frames taking place, the connection of the rod 49 with the eye-bolt 48 is not effected until a certain amount of lost-motion is taken up as provided by the adjustable set collar 51 being located, when the frames are in their raised position, such that it is somewhat removed from the eye-bolt 48, as viewed in Figure 1. This distance and the amount between the eye-bolt and the said set collar can be altered by mere adjustment of the same along the rod 49. By having this lost-motion a certain amount of manual adjusting may be effected without any buckling of the two frames taking place.

As the power-actuated device 40 is operated to give a considerable amount of movement of the wheel structure to cause lifting of the main frame 21 and working tools 31 and 32 out of their ground-working position, the rod 49 is drawn rearwardly and the stop collar 51 abuts the eye member thereby causing through the vertical plate 47 a buckling of the pivotal connection means 23 to thereby cause a pivotal movement of the main frame about the wheel structure, whereby an additional height of the plow bottoms 31 and 32, located rearwardly of the wheel structure, is effected. A positive movement downwardly of the forward end of the main frame will cause the rear portion of the frame and its working tools to be thrown upwardly. It should now be apparent that there has been provided means adapted to be used with a power-actuated device, wherein the draft frame and the main frame of a trail-behind implement may be buckled as the power-actuated device is actuated to effect lifting of the lifting tools out of their ground-working position and of the tool-supporting frame. It should also be apparent that there has been provided in this means a lost-motion wherein manual adjusting of the working tools may be effected without in any way causing any amount of the buckling of the draft and main frames. The buckling movement is arranged to occur only when the fluid-actuated device is actuated.

While various changes may be made in the detail construction, it shall be understood that such changes shall be within the spirit and scope of the present invention as defined by the appended claims.

What is claimed is:

1. In combination, a tractor, a trail-behind implement including a tool-supporting frame having a working tool thereon, a draft frame connected to the tool-supporting frame for vertical buckling movement therewith and connected to the tractor to react thereagainst when the buckling movement takes place, a wheel structure connected to the tool-supporting frame for adjustment with respect thereto and having wheels located forwardly of the working tool, means for adjusting the wheel structure with respect to the tool-supporting frame, and means responsive to the adjusting means for positively buckling downwardly the draft frame and the tool-supporting frame about its wheels whereby the working tool will be thrown upwardly a distance beyond that which it would ordinarily be raised by movement of the wheel structure alone.

2. In combination, a tractor, a trail-behind plow including a main plow frame having plow bottoms thereon, a draft frame pivotally connected to the main plow frame for vertical buckling movement therewith and connected to the tractor to react thereagainst when the buckling movement takes place, a wheel structure connected to the main plow frame for pivotal movement with respect thereto, said wheel structure for supporting the plow frame including crank axles, land and furrow wheels respectively connected to the crank axles, both of said wheels located forwardly of the plow bottoms, means for pivoting the wheel structure with respect to the main plow frame, and means responsive to the wheel structure pivoting means for positively buckling downwardly the draft frame and the main plow frame on its supporting wheels whereby the plow bottoms will be thrown upwardly a distance beyond that which they would ordinarily be raised by movement of the wheel structure alone.

3. In combination, a tractor, a trail-behind implement including a tool-supporting frame having a working tool thereon, a draft frame connected to the tool-supporting frame for vertical buckling movement therewith and connected to the tractor to react thereagainst when the buckling movement takes place, a wheel structure pivotally connected to the tool-supporting frame for vertical adjustment with respect thereto and having wheels located forwardly of the working tool, means connected between the pivotal structure and the tool-supporting frame for effecting vertical adjustment of the wheel structure, and means connected between the draft frame and the wheel structure and thereby responsive to the adjusting means for positively buckling the draft frame and forward end of the tool-supporting frame with respect to each other, whereby the working tool will be thrown upwardly a distance beyond that which it would ordinarily be raised by movement of the wheel structure alone.

4. In combination, a tractor, a trail-behind implement including a tool-supporting frame having a working tool thereon, a draft frame connected to the tool-supporting frame for vertical buckling movement therewith and connected to the tractor to react thereagainst when the buckling movement takes place, a wheel structure pivotally connected to the tool-supporting frame for vertical adjustment with respect thereto and having wheels located forwardly of the working tool, manually adjustable means connected to the pivotal wheel structure for adjusting the tool-supporting frame and its working tool, power means including a power-actuated device connected to the pivotal wheel structure to power adjust the tool-supporting frame and its working tool, and lost motion means connected between the draft frame and the pivotal wheel structure ineffective within the normal range of adjusting movement of the manual adjustable means but effective upon actuation of the power adjustable means to positively buckle the draft frame and the forward end of the tool-supporting frame, whereby the working tool will be thrown upwardly a distance beyond that which it would ordinarily be raised by movement of the wheel structure alone.

5. In combination, a tractor, a trail-behind implement including a tool-supporting frame having a working tool thereon, a draft frame connected to the tractor to react thereagainst, pivotal connection means for connecting the draft frame with the tool-supporting frame whereby buckling of the two frames may be effected, a wheel structure connected to the tool-supporting frame for vertical adjustment with respect thereto and having its wheels located forwardly of the working tool, manually adjustable means connected to the wheel structure for adjusting the tool-supporting frame and its working tool, power means including a power-actuated device connected to the wheel structure to power adjust the tool-supporting frame and its working tool, and lost-motion means connected between pivotal connection means and the adjustable wheel structure ineffective within the normal range of adjusting movement of the manualy adjustable means but effective upon actuation of the power adjustable means to positively buckle downwardly the draft frame and the forward end of the tool-supporting frame, whereby the working tool will be thrown upwardly a distance beyond that which it would be ordinarily raised by movement of the wheel structure alone.

6. In combination, a tractor, a trail-behind implement including a tool-supprting frame having a working tool thereon, a draft frame connected to the tractor to react thereagainst, pivotal connection means for connecting the draft frame with the tool-supporting frame whereby downward buckling of the two frames may be effected, a wheel structure connected to the tool-supporting frame for vertical adjustment with respect thereto and having its wheels located forwardly of the working tool, power means including a lifting power source provided on the tractor, a power-actuated device on the implement, means for operatively connecting the power-actuated device on the implement with the lifting power source on the tractor, means for connecting the power-actuated device to the wheel structure to adjust the same, and means responsive to the power-actuated device and associated with the pivotal connection means for positively buckling downwardly the draft frame and the tool-supporting frame about its wheels whereby the working tool will be thrown upwardly a distance beyond that which it would ordinarily be raised by movement of the wheel structure alone.

7. In combination, a tractor having a fluid power source, a trail-behind plow including a main plow frame having a plow bottom thereon, a draft frame connected to the tractor to react thereagainst, pivotal connection means for connecting the plow frame with the draft frame whereby downward buckling of the two frames may be effected, a crank axle structure pivotally connected to the main plow frame for vertical adjustment with respect thereto and having supporting wheels located forwardly of the plow bottom, a fluid power actuated device on the trail-behind plow, conduit means for connecting the fluid power device with the fluid pressure source on the tractor, means for connecting the power-actuated device to the crank axle structure to adjust the same, and means responsive to the power-actuated device and associated with the pivotal connection means for positively buckling downwardly the draft frame and the plow frame about the supporting wheels whereby the plow frame will be thrown upwardly a distance beyond that which it would ordinarily be raised by movement of the crank axle structure alone.

CARL W. MOTT.